(12) United States Patent
Acharya

(10) Patent No.: US 6,215,916 B1
(45) Date of Patent: *Apr. 10, 2001

(54) EFFICIENT ALGORITHM AND ARCHITECTURE FOR IMAGE SCALING USING DISCRETE WAVELET TRANSFORMS

(75) Inventor: Tinku Acharya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/018,601

(22) Filed: Feb. 4, 1998

(51) Int. Cl.$^7$ ...................................................... G06K 9/32
(52) U.S. Cl. ............................ 382/298; 382/248; 348/398
(58) Field of Search ................................. 382/298, 248, 382/260, 299, 131; 348/407, 403, 398

(56) References Cited

U.S. PATENT DOCUMENTS

| | | | |
|---|---|---|---|
| 5,495,292 | * | 2/1996 | Zhang et al. ............................ 348/407 |
| 5,604,824 | * | 2/1997 | Chui et al. ............................. 382/248 |
| 5,838,377 | * | 11/1998 | Greene .................................. 348/398 |
| 5,841,890 | * | 11/1998 | Kraske .................................. 382/131 |
| 5,875,122 | * | 2/1999 | Acharya ............................. 364/726.05 |
| 5,883,978 | * | 3/1999 | Ono ..................................... 382/248 |
| 6,023,296 | * | 2/2000 | Lee et al. .............................. 348/405 |

* cited by examiner

*Primary Examiner*—Yon J. Couso
(74) *Attorney, Agent, or Firm*—Blakely, Sokoloff, Taylor & Zafman LLP (57) ABSTRACT

What is disclosed is an image scaling technique and apparatus. The technique and apparatus utilizes a discrete wavelet transform (DWT). The DWT is applied row-wise to an image, which results in a low frequency sub-band and a high frequency sub-band. The DWT is again applied column-wise to the result of the row-wise DWT. The end result is a 2:1 scaled image. The process may be modified easily to obtain a 4:1 scaled image. Further, the architecture for computing the DWT provides high throughput and is composed, due to the nature of the DWT of address multipliers, registers and delay elements.

18 Claims, 8 Drawing Sheets

210
Apply DWT row-wise to the entire original image (MxN)

215
Store low frequency sub-bands into image array (MxN/2)

220
Apply DWT column-wise to the result of the row-wise DWT, considering only the LFS (M/2xN/2)

230
Normalize the data and store results as scaled image

EFFICIENT ALGORITHM AND ARCHITECTURE FOR IMAGE SCALING USING DISCRETE WAVELET TRANSFORMS

BACKGROUND OF THE INVENTION

1. Field of the Invention

The invention is related to signal/image processing. More specifically, the invention relates to architectures and methods for image scaling.

2. Description of Related Art

A digital image of a scene/environment has a particular size which is defined by the number of rows and columns of pixels (individual color/intensity points) that it contains. The image size or "resolution" is thus expressed as the number of columns multiplied by the number of rows. For instance, an image with a resolution of 768×576 has 768 columns and 576 rows of pixels for a total of 442,368 pixels.

Often, the original size of an image as captured by an imaging device such as a camera or as later represented is too large for a particular application. While a larger resolution image contains more image information (more pixels per area) and is likely of a more desirable visual quality than a lower resolution image, bandwidth, memory and other constraints may dictate that a lower resolution image be used. For certain devices, such as digital cameras, it may be desirable to reduce its overall cost by utilizing a smaller resolution image so that the required storage component in the device is also smaller. In the context of still image capture, it may be desirable to have smaller resolution images due to the limitations of not only of storage, but of the need to be able to download images that are stored on the camera quickly to another device such as a computer system for further processing or more permanent storage. Scaling may also be desirable due to the limitations of what resolutions will fit on a display screen rendered. In videoconferencing, it is often desirable to maintain a certain "frame" rate (the rate at which individual image frames are received and/or rendered for output). To maintain this frame rate, formats such as QCIF (Quarter Common Intermediate Format) have been defined which are typically smaller than most captured digital image sizes, particularly those captured from certain digital cameras. To accommodate the need for a particular image size a process known as image scaling is employed.

When an image is scaled "up," its size is increased and when it is scaled "down" its size is reduced. Hereinafter, when the application refers to "scaling" or "scaled image", down scaling or reduction in image size is the intended meaning and usage of those terms.

Figure 1:
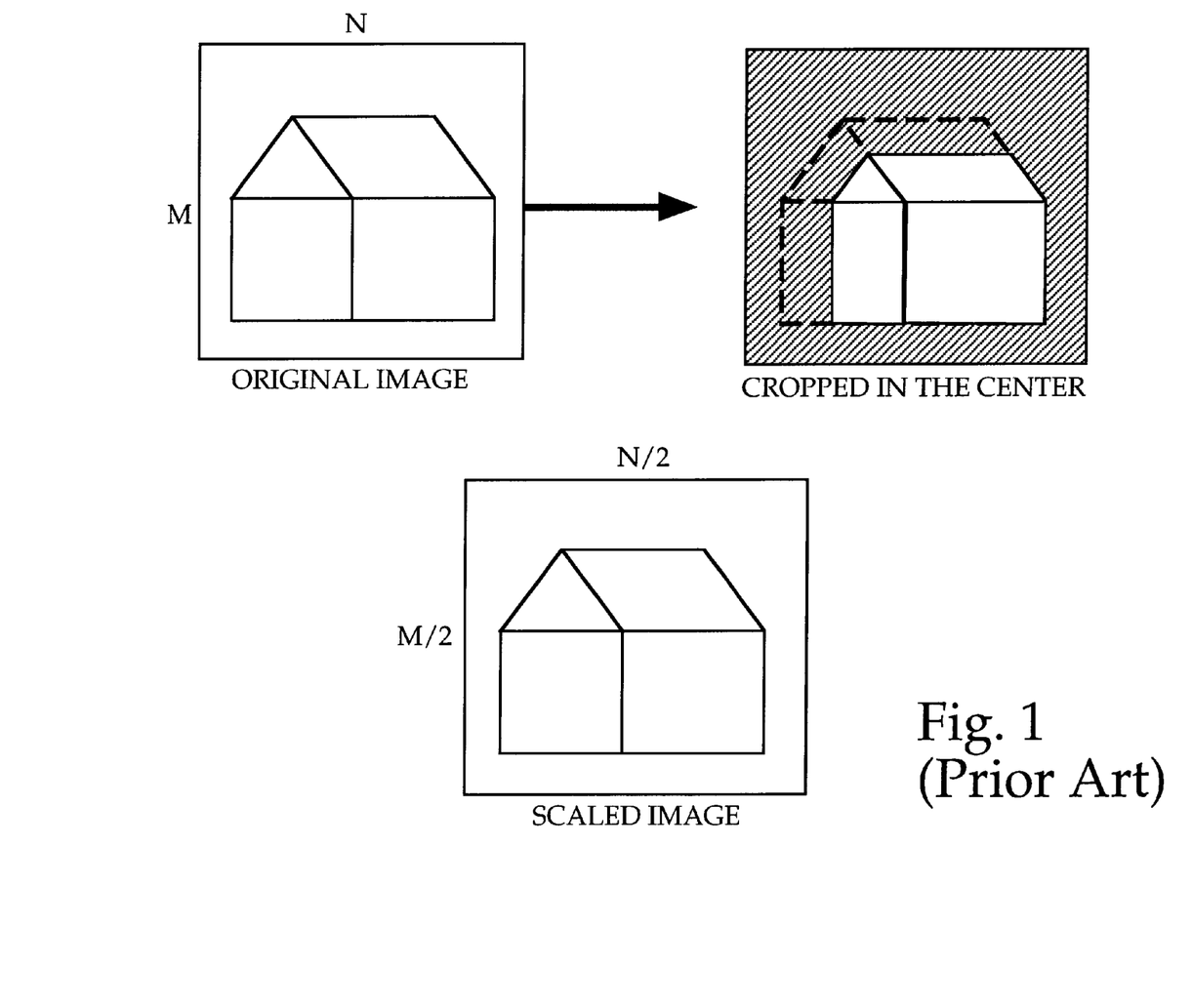
FIG. 1 illustrates the difference between the scaling of an image and image cropping.

The scaling of an image should be distinguished from image cropping, where the resolution is reduced by cutting out a portion of the image. Scaling implies that while the size of the image is reduced, the visual information of the entire scene/environment in the original image is maintained in great majority. The scene from the original image remains complete but is represented in a lower resolution after scaling. FIG. 1 illustrates the difference between the scaling of an image and image cropping. The original image is of a house and has a resolution of M by N. The cropped image of the house is missing a portion of the house. The scaled image retains the entire house from the original image but is scaled in half with a resolution of M/2 rows and N/2 columns.

Image scaling has been achieved in the art in several ways. The most common scaling technique averages pixels in a particular image region using equal weighting and then "decimates" or throws away entire pixels in the region, thereby generating a pixel in the scaled image. The averaged pixel replaces an entire region of pixels, with the replaced region not necessarily the same size as the averaging region. An averaging method where each pixel in the sampling region is given equal weighting however is deficient in several regards. Primarily, the equal averaging of pixels has the effect of losing much of the original image information especially edge features. Equal weight averaging does little to identify image features, since it treats all parts of the image region identically and then decimates all pixels. There are currently no well-defined methods for recovering the image information lost due to averaging. When attempting to reconstruct back to their original size an image scaled by these techniques, the resulting reconstruction is often blurry and shows a marked loss in visual quality. The distortion in the image after reconstruction is due to the fact that pixels included in averaging and then thrown away cannot be recovered exactly. This is particularly true in images that have high entropy, i.e., pixels of widely varying intensity/color values. Thus, a scaling technique is desired that can allow adequate reconstruction of image after scaling such that image features are better preserved.

Furthermore, with regard to implementation, if scaling is to be implemented in hardware such as a CMOS (Complementary Metal-Oxide Semiconductor) imaging device, it is important to reduce the computational complexity of the scaling procedure, especially when many other functions must also be carried out by the device. When an imaging device is used to transmit image frames (a sequence of individual still images) for the purpose of videoconferencing, the transmission must be fast enough to maintain frame rate and be compatible with the bandwidth capability of the interface between the imaging device and the processing device (computer system) that is used to package and transmit image frames to the destination node. With devices that are dual-moded, which may provide both motion and still imaging, there is also desired methods and apparatus that can readily provide different levels of scaling interchangeably. In certain averaging techniques in the current state of the art, particularly the seven-tap (4:1 scaling) and three-tap (2:1 scaling) filtering techniques, it is difficult to design a dual-moded and efficient scaling apparatus.

In a device such as a digital camera, whether still or motion video, image scaling should be able to be performed in integrated circuits with a minimum of cost and area. In applications where speed of image capture and processing is desirable with a minimum loss of image features due to scaling, there is needed a scaling technique and apparatus that is capable of efficient data throughput.

SUMMARY

What is disclosed is a method that includes applying a discrete wavelet transform in a first direction to an image generating thereby a high frequency sub-band (HFS) and a low frequency sub-band (LFS), and applying a discrete wavelet transform in a second direction to the LFS generating thereby a low frequency sub-band of the LFS, and a high frequency sub-band of said LFS, the low frequency sub-band of the LFS representing a scaled version of the image.

DETAILED DESCRIPTION OF THE INVENTION

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

Using traditional Fourier analysis or transforms, any signal can be approximated as a sum of sinusoidal waveforms of assorted frequencies. While Fourier transforms are ideally suited for signals having repeated behavior, they fail to efficiently approximate signals with sharp discontinuities such as the edge features in images, or signals encoded for digital communications. Thus, Fourier analysis is unsuited where image features need to be preserved since the Fourier transform does not, in the first place, well represent the image features. Another form of signal analysis, known as Wavelet analysis has been developed to better represent signals that have exaggerated and discontinuous features. The wavelet itself is a discontinuous and jagged curve when rendered, and by combining several wavelets, a much improved representation of image features is available. A transform, similar to the Fourier transform, Discrete Wavelet Transform (DWT), based on Wavelet analysis, has been developed to represent digital signals where discontinuities should be preserved such as in the edge features of digital images.

Like the Fourier transform, the Wavelet transform is localized in frequency. It converts time-domain signals into frequency domain. However, a fundamental difference between Fourier transforms and Wavelet transforms is that Wavelet transforms are also localized in space. Thus, both space (time-domain) and frequency are preserved when a signal is decomposed by Wavelet analysis. Since the Fourier transform is periodic in nature, it does not well represent spatial discontinuities, whereas as the Wavelet transform is by nature discontinuous and has localized variations that disappear or do not exist in all locations of the signal. Wavelet theory is well-known in the art of signal analysis and will not be described so as not to obscure the invention.

The DWT is a "discrete" algorithm, and thus approximates the input signal by discrete samples of a full wavelet. Thus, with these discrete sample points, the DWT can be thought of as also being a filter with well-defined coefficients. Unlike the Fourier transforms or averaging filters, the Wavelet coefficients can be selected to suit particularly the application, or type of input signal. The DWT chosen in at least one embodiment of the invention for image scaling is the 9-7 bi-orthogonal spline filter. Since the DWT is discrete, the DWT can be implemented using digital logic such as Very Large Scale Integration (VLSI) circuits and thus can be integrated on a chip with other digital components. Thus, the DWT can easily be implemented in an imaging device such as a digital still or video camera. The ability of the DWT to better approximate the features of an image make it ideal for a scaling application. It is advantageous over averaging type scaling in that image features can be reconstructed with better results. Further, as shown and described below, an architecture for DWT can be implemented efficiently for high data throughput, unlike Fourier or averaging techniques which require multiple cycles or iterations to generate a single output datum.

Figure 2A:
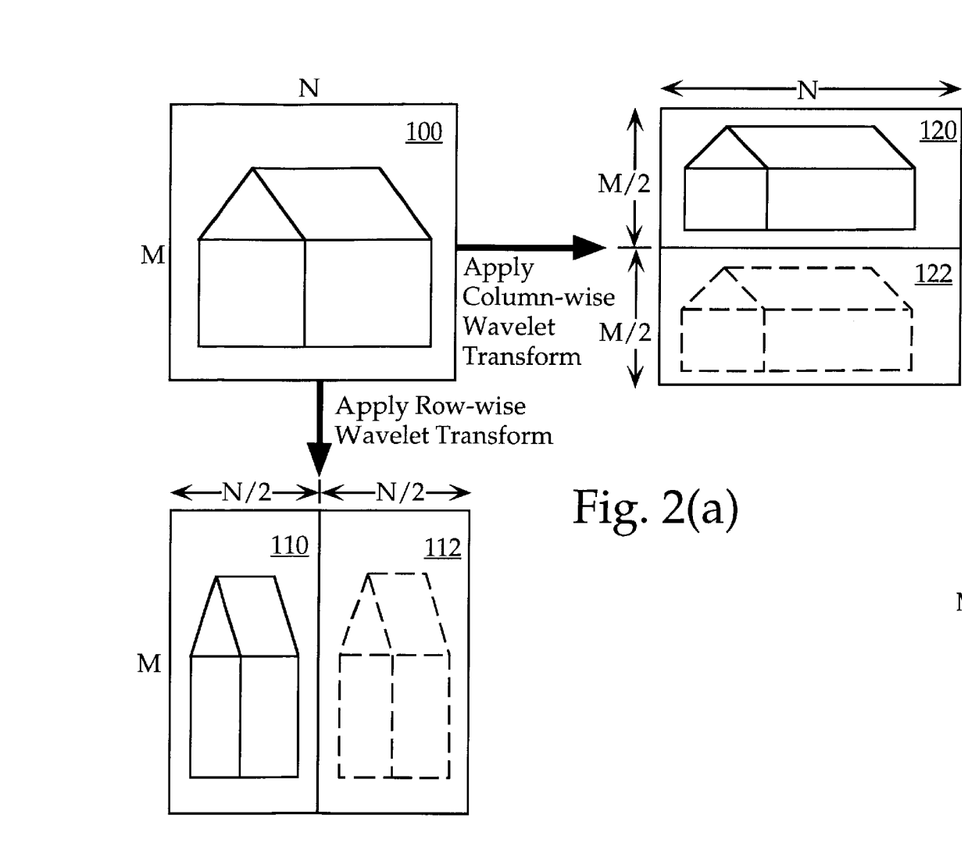
FIG. 2(a) illustrates one-dimensional DWT scaling.

FIG. 2(a) illustrates one-dimensional DWT scaling.

The essence of the DWT is to decompose an input signal into two or more frequency sub-bands. An input signal may be decomposed into two outputs—a low frequency sub-band output and a high frequency sub-band output. The low frequency sub-band contains statistical characteristics of the original signal/image. Hence, it can be decomposed further and further lending to its multi-resolution capability. With this capability of the DWT, each sub-band can further be divided into smaller and smaller sub-bands as is desired.

As mentioned, the wavelet has the property of representing a signal or input as a combination of spatial and frequency domain representation. A DWT applied to an image can perform scaling by essentially extracting one or more sub-bands and discarding the remainder. A DWT can be applied across an image region either rowwise or column-wise. FIG. 2(a) shows both such applications.

An image 100 of an object and/or scene has a dimension M×N (M rows and N columns of pixels). If a wavelet transform is applied in one-dimension, such as row-wise, the result will be two-sub-bands 110 and 112. The LFS (low frequency sub-band) is sub-band 110 and is illustrated in solid lines while the HFS (high frequency sub-band) is sub-band 112 illustrated in dashed lines. Each sub-band 110 and 112 is an elongated skinny version of the original image 100. The HFS sub-band 112 contains high frequency noise and some less significant edge information while LFS sub-band 110 contains more significant edge information and statistical characteristics of the original image. In one embodiment of the invention, the HFS sub-band 112 can be discarded, and the LFS sub-band 110 preserved for the scaling procedure. Each sub-band 110 and 112 created by row-wise application of a DWT upon original image 100 has dimensions of M×N/2 (M rows and N/2 columns of pixels) in relation to the original image 100. The row-wise DWT can be envisioned in the following way. Each row of pixels in the original image 100 that are subjected to the DWT is split into a LFS and HFS, which are separable and contain different image information. Each sub-band contains a version/approximation of the entire row, and thus, applied over the entire image, essentially results in two vertical region of M rows, each region comprising a sub-band.

Likewise, FIG. 2(a) also illustrates the result of applying DWT in a column-wise rather than row-wise fashion. A column-wise application of the DWT also results in two sub-bands, an LFS 120 and an HFS 122. LFS 120 and HFS 122 are a wide and fat versions of the original image and have dimensions of M/2×N (M/2 rows and N columns). The HFS 122 contains high frequency noise and some less significant edge information while LFS 120 contains significant information and statistical characteristics of the original image. In one embodiment of the invention, HFS 122 is discarded while LFS 120 is preserved when determining the content of the scaled image. The column-wise DWT splits each column of pixels in the original image into two separable portions—namely a high frequency portion and a low frequency portion. As applied over the entire image, there are thus generated two horizontal sub-bands of N columns.

Figure 2B:
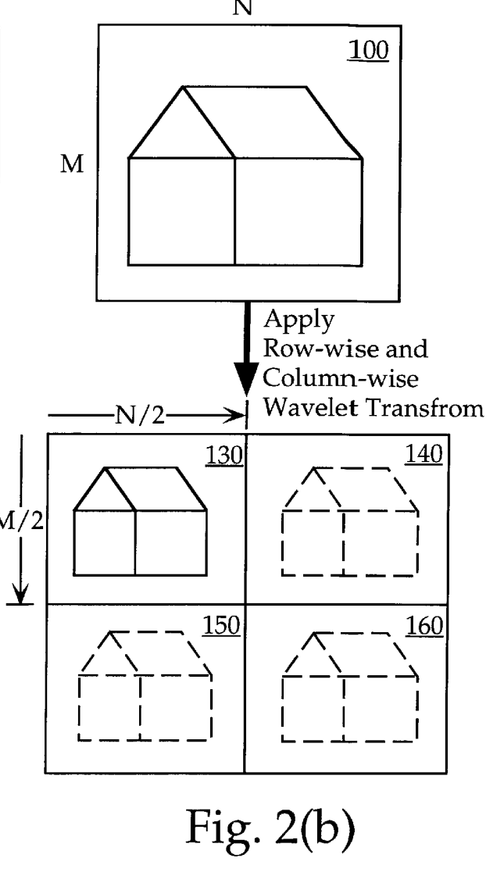
FIG. 2(b) illustrates two-dimensional DWT scaling.

FIG. 2(b) illustrates two-dimensional DWT scaling.

To achieve two-to-one scaling, neither of the two applications of the DWT (row-wise or column-wise) is alone sufficient to produce the desired results, namely the replacement of every two rows and columns of pixels in the original image with one pixel in the scaled image. Thus, according to one embodiment of the invention, the DWT is applied both row-wise and column-wise to an original image in order to determine the scaled image. First, the DWT can be applied to the original image in a row-wise fashion. This will create two vertical sub-bands like sub-band 110 and sub-band 112 of FIG. 2(a). Then to those sub-bands, the DWT is applied in a column-wise fashion. This will create four sub-bands—130, 140, 150 and 160—as illustrated in FIG. 2(b). Each sub-band will have a resolution of M/2 by N/2 (M/2 rows and N/2 columns). The sub-band 130 is then extracted out and becomes the 2:1 scaled image.

According to one embodiment of the invention, the other three sub-bands —140, 150 and 160—are discarded. By using a DWT to achieve scaling, the original image can be more easily reconstructed from the scaled image 130. This contrasts with traditional averaging methods of scaling where the original values cannot be recovered since they are averaged in and decimated out. Each sub-band 140, 150 and 160 contains different information about the original image. Sub-band 140 contains some edge information that are horizontal in the image plane while sub-band 150 contains some edge information that are vertical. Sub-band 160 contains some diagonal edge information.

Figure 3:
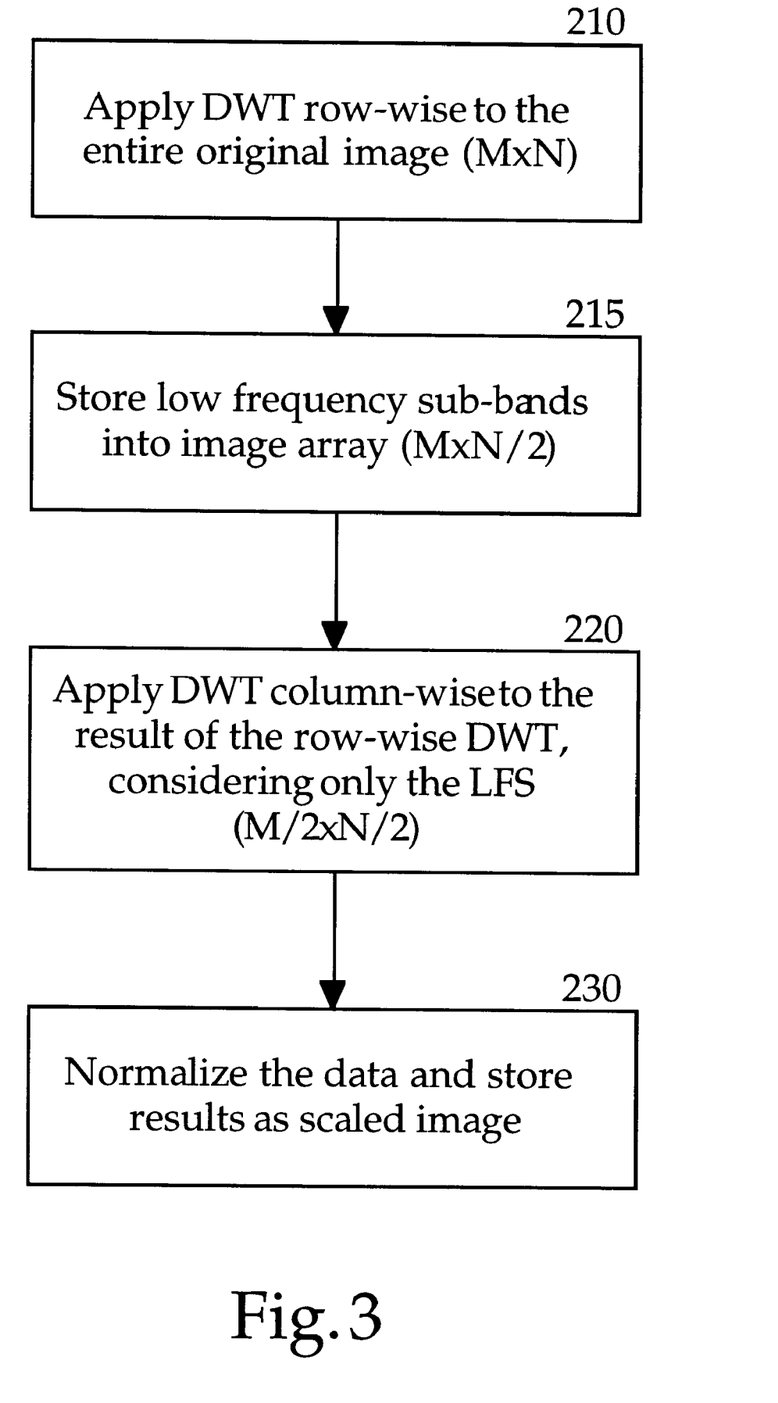
FIG. 3 is a flow diagram of one embodiment of the invention.

FIG. 3 is a flow diagram of one embodiment of the invention.

Figure 5A:
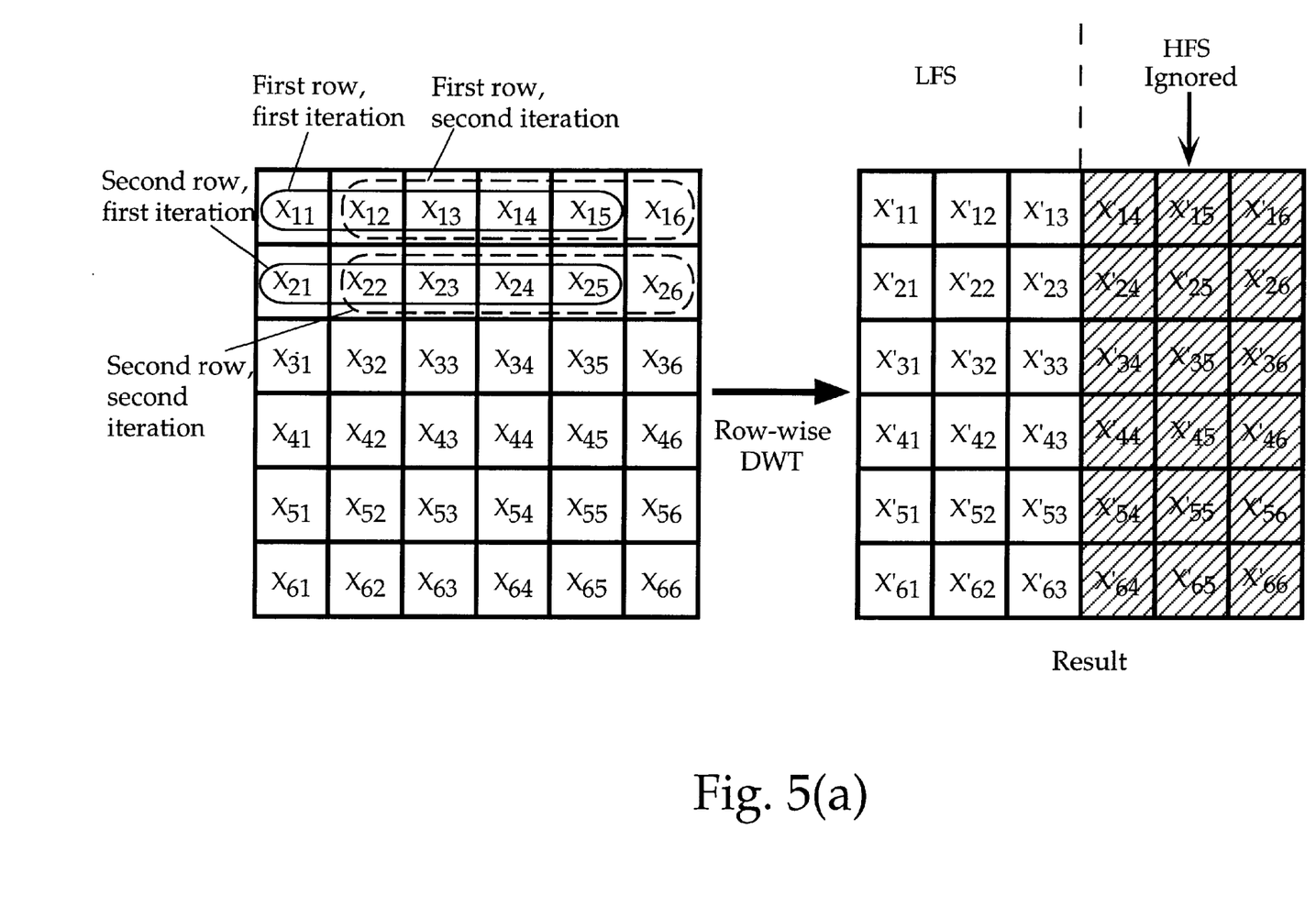
FIGS. 5(a) and 5(b) are diagrams illustrating row-wise and column-wise application of a DWT and corresponding inputs to an architecture such as that shown in FIG. 4(a).
Figure 5B:
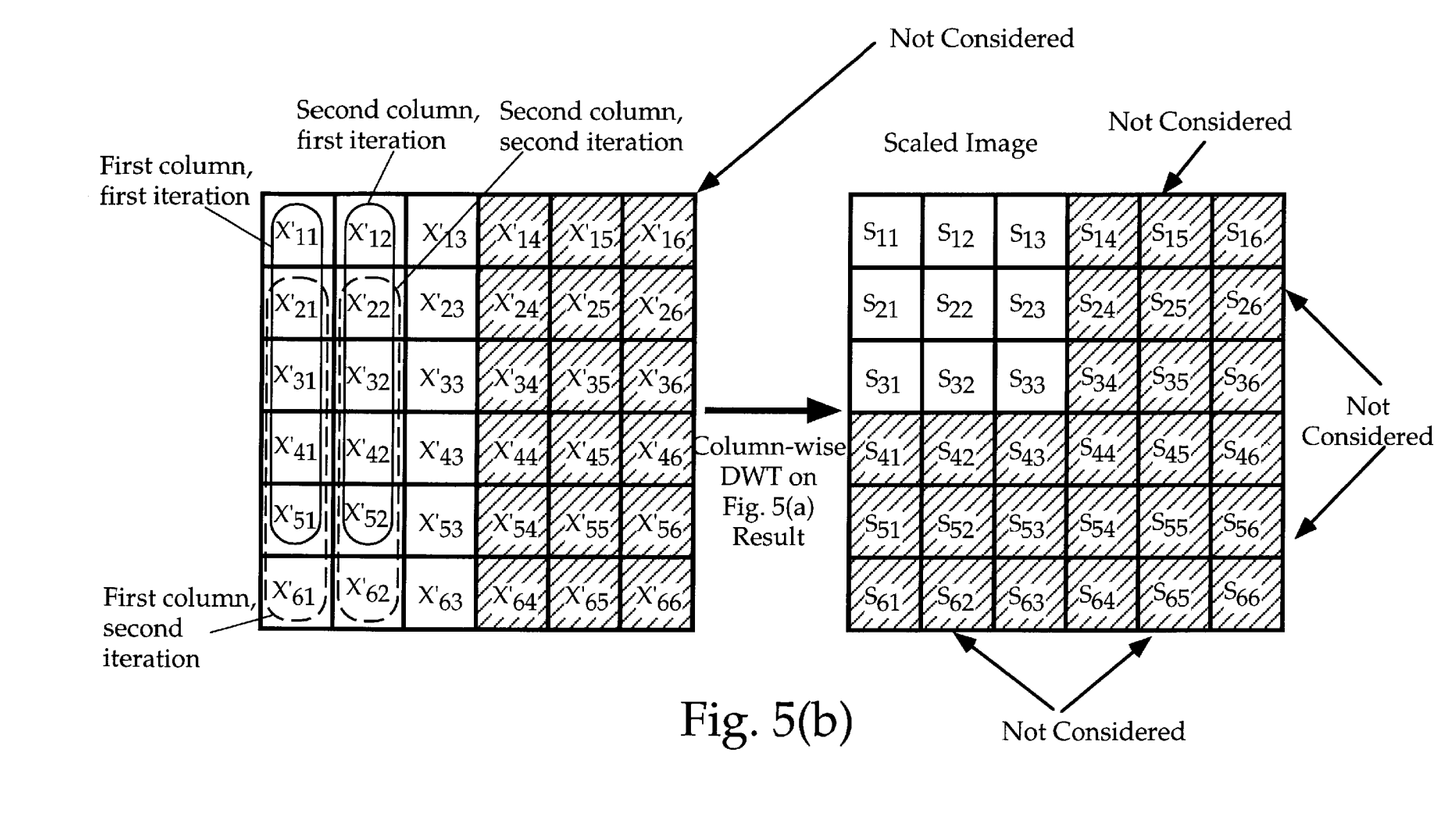

The methodology for discrete wavelet transform (DWT) based scaling of an image involves a step-wise application of the DWT. First, the DWT is applied row-rise to the entire original image (step 210). From FIG. 2(a), such an applying of the DWT generates both an HFS and LFS. The low frequency sub-band may be stored into an image array which may be a memory or other storage device (step 215). As each pixel value for a row of the sub-band that is being processed is attained, it may be stored into the same memory storing the original image at the same location. FIGS. 5(a)–5(b), described below, shows this possibility since a given original image pixel which is a starting pixel is thereafter not needed for the next iteration of the DWT. Once the DWT is applied row-wise, and the resulting low frequency sub-band stored into the image array, the next dimension may be operated upon by the DWT. Since, according to one embodiment of the invention, only the LFS is considered in the final scaled result, in the intermediate step of the scaling technique only the LFS result need be operated upon. Thus, according to step 220, the DWT is applied to LFS resulting from the row-wise application of the DWT (in step 210). Whereas, the row-wise application of the DWT traverses through and processed all M×N pixels of an original image, the column-wise DWT needs to consider only half that number, namely M×N/2, since this is the resolution of the LFS resultant from step 210. When the column-wise DWT operation is complete, the results of the image array in the first M/2 rows and N/2 columns of pixels will represent the scaled image (see FIG. 2(b)). The data obtained from step 220 is normalized and stored as the scaled image (step 230). Normalization may be needed in a CFA to convert a larger data value that may occur in the DWT operation. Normalization of data result R may be achieved by the following formula: (R−min)/(max−min)*K, where min is the minimum result value, max the maximum result value and K the maximum desired normalized value. For instance, if an 8-bit value is desired, K=255.

Figures 4A, 4B:
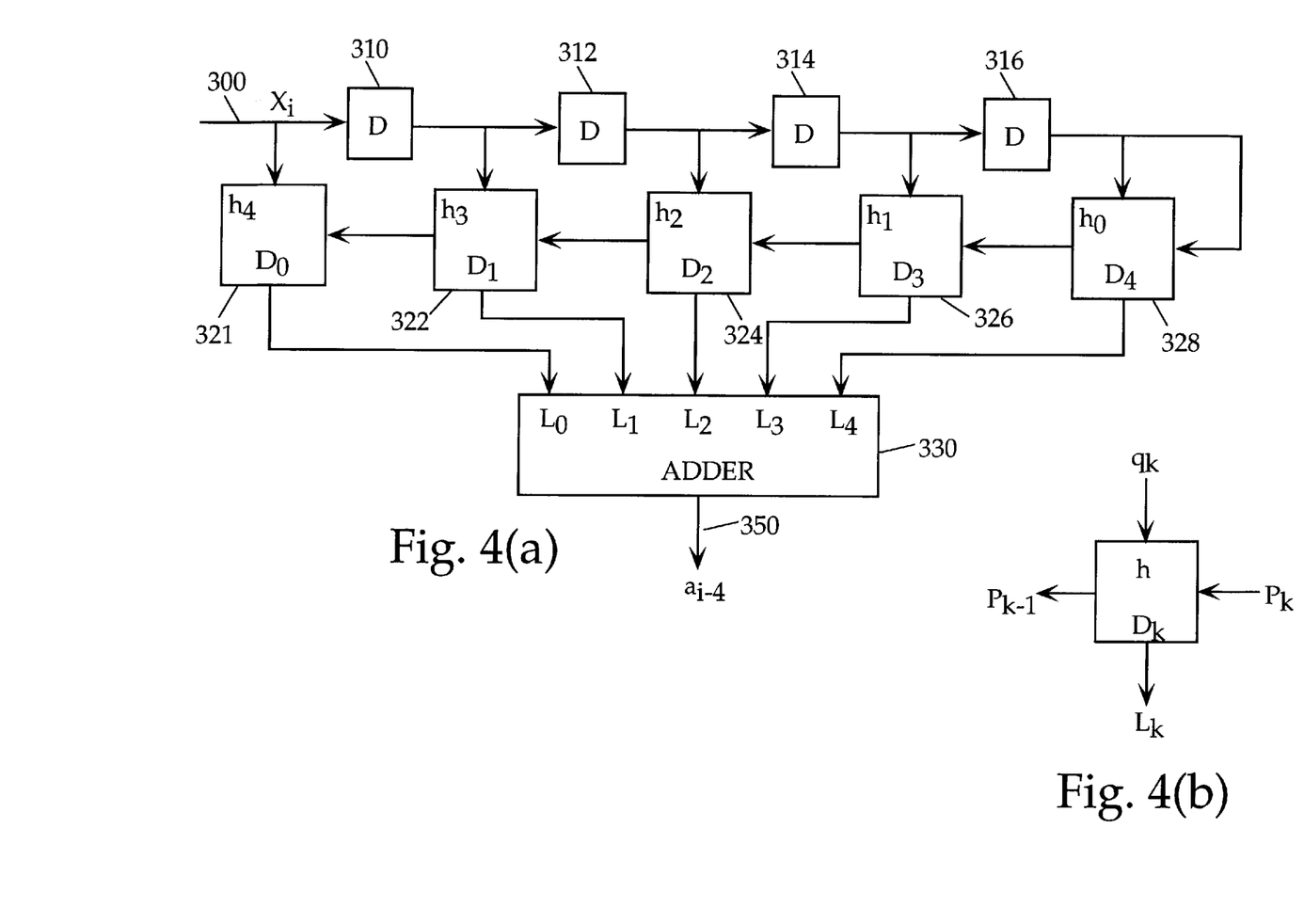
FIG. 4(a) shows a systolic architecture for computing a forward Discrete Wavelet Transform utilized from image scaling.
FIG. 4(b) shows a basic processing cell utilized in the architecture of FIG. 3(a).

FIG. 4(a) shows a systolic architecture for computing a forward Discrete Wavelet Transform utilized for image scaling.

FIG. 4(a) shows an input $x_i$ 300 which is a single N-bit value from an image pixel representing its intensity or color value. Further, the various adders, multipliers and registers discussed can be readily designed by one skilled in the art depending upon the precision/type required. In order for the array shown in FIG. 4(a) to be initialized, inputs $x_1$, $X_2$, $x_3$, and $x_4$ must first propagate through the delay elements 310, 312, 314, and 316. Thereafter, for every $x_i$ 300 that is input, two outputs will be generated by the array. This output is shown in FIG. 4(a) as $a_{i-4}$ 350, which is the low frequency sub-band (LFS) output of a discrete wavelet transform.

Each of the basic processing cells which compose the architecture are comprised of an adder and a multiplier. The intermediate outputs, $L_0$ from cell $D_0$ 321, $L_1$ from cell $D_1$ 322, $L_2$ from cell $D_2$ 324, $L_3$ from cell $D_3$ 326, and $L_4$ from cell $D_4$ 328, are added by adder 330 to generate the LFS values $a_{i-4}$ 350. Unlike DWTs for other applications, the high frequency sub-band(s) are not needed, and therefore are not computed. At i=4, the LFS output $a_0$ will be generated and observed. The architecture is therefore 100% utilized since, at every clock cycle following i=4, one output, $a_{i-4}$ is being generated.

The architecture shown in FIG. 4(a) is "systolic", i.e., repeated, in that each of the processing cells 321, 322, 324, 326 and 328 are composed of one adder and one multiplier and vary only in the value of the DWT coefficients that they hold. These coefficients may be stored in a programmable register or other memory, so that they may be modified if desired.

FIG. 4(b) shows a basic processing cell utilized in the architecture of FIG. 4(a).

FIG. 4(b), which shows the basic processing cell $D_k$ 200, is described below to aid in understanding the architecture of FIG. 4(a). Referring to FIG. 4(b), given a filter coefficient g, representing low-pass wavelet coefficients, an intermediate output $L_k$ is computed by the following expression: $L_k=(p_k+q_k)*h$. In the expressions for $L_k$, the term qk represents the input pixel intensity/color value which is the subject of the DWT, while the term $p_{k-1}$ refers to the input pixel intensity/color value from the coupled processing cell from the previous clock cycle and $p_k$ the input pixel intensity/color value of the current clock cycle. The input $p_k$ is passed through to output $p_{k-1}$ from a cell $D_k$ to the previous cell $D_{k-1}$ in the architecture. Thus the terms $p_k$ and $p_{k-1}$ will be referred to hereinafter as "propagated inputs."

The basic processing cell 300 of FIG. 4(b) may be repeatedly built and coupled to perform the forward DWT computation.

The LFS outputs forward DWT computation, which is implemented by the architecture in FIG. 4(a), can be represented by $a_n=\upsilon_K h_{2n-K} x_K$. The low-pass DWT filter coefficients "h" have certain symmetric properties which can be manipulated to implement the architecture shown in the array of FIG. 4(a). An optimal DWT to use for image scaling is a bi-orthogonal spline filter, which by its properties can simplify the DWT computation. A bi-orthogonal spline filter has nine low-pass filter coefficients $h_{-4}, h_{-3}, h_{-2}, h_{-1}, h_0, h_1, h_2, h_3$, and $h_4$. The biorthogonal spline filter also has seven high-pass filter coefficients $g_{-2}, g_{-1}, g_0, g_{-1}, g_{-2}, g_3$, and $g_4$, which are not considered in scaling according to one embodiment of the invention.

The LFS outputs are as follows:

$$a_0 = h_0 x_0 + h_{-1} x_1 + h_{-2} x_2 + h_{-3} x_3 + h_{-4} x_4,$$

$$a_1 = h_2 x_0 + h_1 x_1 + h_0 x_2 + h_{-1} x_3 + h_{-2} x_4 + h_{-3} x_5 + h_{-4} x_6,$$

$$a_2 = h_4 x_0 + h_3 x_1 + h_2 x_2 + h_1 x_3 + h_0 x_4 + h_{-1} x_5 + h_{-2} x_6 + h_{-3} x_7 + h_{-4} x_8,$$

$$a_{n/2-2} = h_4 x_{N-8} + h_3 x_{N-7} + h_2 x_{N-6} + h_1 x_{N-5} + h_0 x_{N-4} + h_{-1} x_{N-3} + h_{-2} x_{N-2} + h_{-3} x_{N-1},$$

$$a_{n/2-1} = h_4 x_{N-6} + h_3 x_{N-5} + h_2 x_{N-4} + h_1 x_{N-3} + h_0 x_{N-2} + h_{-1} x_{N-1}.$$

One property of the low-pass wavelet coefficients is that of symmetry such that $h_{-i} = h_i$. Thus, $h_{-1} = h_1$, $h_{-2} = h_2$, $h_{-3} = h_3$, and $h_{-4} = h_4$. Thus, $a_1$ may be rewritten as:

$$a_1 = h_0 x_2 + h_1(x_1 + x_3) + h_2(x_0 + x_4) + h_3 x_5 + h_4 x_6.$$

Likewise, other LFS outputs may be conveniently re-arranged such that only one add and one multiply operation is required in each processing cell. The simplified LFS outputs after applying the symmetric DWT properties for low-pass coefficients are as follows:

$$a_0 = h_0 x_0 + h_1 x_1 + h_2 x_2 + h_3 x_3 + h_4 x_4$$

$$= h_0(x_0+0) + h_1(x_1+0) + h_2(x_2+0) + h_3(x_3+0) + h_4(x_4+0)$$

$$a_1 = h_2 x_0 + h_1 x_1 + h_0 x_2 + h_1 x_3 + h_2 x_4 + h_3 x_5 + h_4 x_6$$

$$= h_0(x_2+0) + h_1(x_1+x_3) + h_2(x_0+x_4) + h_3(x_5+0) + h_4(x_6+0)$$

$$a_2 = h_0(x_4+0) + h_1(x_3+x_5) + h_2(x_2+x_6) + h_3(x_1+x_7) + h_4(x_0+x_8)$$

$$a_3 = h_0(x_6+0) + h_1(x_5+x_7) + h_2(x_4+x_8) + h_3(x_3+x_9) + h_4(x_2+x_{10})$$

$$a_4 = h_0(x_8+0) + h_1(x_7+x_9) + h_2(x_6+x_{10}) + h_3(x_5+x_{11}) + h_4(x_4+x_{12})$$

The symmetry of the coefficients also reduces the total number of processing cells required so that an architecture like that of FIG. 4(a) may be used to compute the forward DWT.

At the fifth clock cycle, i=4, the LFS output $a_{i-4}$ 350 is observed. Returning to the architecture of FIG. 4(a), $a_0$ is determined as follows. At i=4, the fifth clock cycle, cell $D_0$ 321 receives $x_4$, $D_1$ 322 receives $x_3$ (from previous cycle), $D_2$ 324 receives $x_2$, $D_3$ 326 receives $x_1$ and $D_4$ 328 receives 0 as their respective $q_i$ values. Also, at i=4, the propagated input $p_i$ for cell $D_4$ 328 is $x_0$. Since there is, by definition, no $x_{-1}, x_{-2}$, etc., cells $D_1$ 322 and $D_0$ 321 receive nulls or 0 values at i=4. Using the basic formula $L_i = (p_i + q_i) * h$ for each processing cell, we get from $D_0$ 321 the intermediate output $L_0 = (0 + x_4) * h_4$. Likewise, $D_1$ 322 generates $L_1 = (0 + x_3) * h_3$, $D_2$ 324 generates $L_2 = (0 + x_2) * h_2$, $D_3$ 326 generates $L_3 = (0 + x_1) * h_1$ and $D_4$ 328 generates $L_4 = (x_0 + 0) * h_0$. Adder 330 computes the sum of $L_0, L_1, L_2, L_3$ and $L_4$ which yields the first output $$a_0 = x_0 h_0 + x_1 h_1 + x_2 h_2 + x_3 h_3 + x_4 h_4.$$

In the case for i=4, $D_3$ 326 receives no propagated input from $D_4$ 328 since $D_4$ 328 received no propagated input $q_i$ (referring to the processing cell for FIG. 4(b)) until i=4. Similarly, all the LFS outputs $a_{i-4}$ 350 may be computed. The processing cell of FIG. 4(b) may also contain a latch register or other mechanism to hold propagated inputs before passing them to the next cell. One reasonably skilled in the art of digital design will readily be able to design/implement the add, multiply and delay elements required by the precision/value of the DWT inputs and outputs.

The symmetric property of bi-orthogonal spline DWT coefficients allows a great reduction in computation, and consequently in the architecture required.

Table 1 below summarizes the intermediate outputs L and final output $a_{i-4}$ at each clock cycle for the forward DWT in the first eight clock cycles (i=0 to 7) and matches the above equations for the simplified outputs.

In Table 1 below, the bracketed form {rst} represents r*(s+t).

TABLE 1

| i | L0 | L1 | L2 | L3 | L4 | $a_{i-4}$ 150 |
|---|---|---|---|---|---|---|
| 0 | $h_4 x_0$ | 0 | 0 | 0 | 0 | not valid |
| 1 | $h_4 x_1$ | $h_3 x_0$ | 0 | 0 | 0 | not valid |
| 2 | $h_4 x_2$ | $h_3 x_1$ | $h_2 x0$ | 0 | 0 | not valid |
| 3 | $h_4 x_3$ | $h_3 x_2$ | $h_2 x1$ | $h_1 x_0$ | 0 | not valid |
| 4 | $h_4 x_4$ | $h_3 x_3$ | $h_2 x2$ | $h_1 x_1$ | $h_0 x_0$ | $a_0$ |
| 5 | $h_4 x_5$ | $h_3 x_4$ | $h_2 x3$ | $\{h_1 x_2 x_0\}$ | $h_0 x_1$ | not observed |
| 6 | $h_4 x_6$ | $h_3 x_5$ | $\{h_2 x_4 x_0\}$ | $\{h_1 x_3 x_1\}$ | $h_0 x_2$ | $a_1$ |
| 7 | $h_4 x_7$ | $\{h_3 x_6 x_0\}$ | $\{h_2 x_5 x_1\}$ | $\{h_1 x_4 x_2\}$ | $h_0 x_3$ | not observed |

As described above, a DWT, unlike Fourier transforms and averaging, has the property, due to the orthogonality of its basic function and symmetry of coefficients for forward and reverse operation of being easily reconstructed after being applied. Thus, in the context of image scaling, the original resolution of an image before scaling may be recovered with no loss in image quality. If the HFS(s) resulting from the DWT operation are not discarded but are stored in the image array, the exact original image may be recovered by applying the DWT in reverse with inverse coefficients. This is well-known in the art of wavelet signal theory.

FIGS. 5(a) and 5(b) are diagrams illustrating row-wise and column-wise application of a DWT and corresponding inputs to an architecture such as that shown in FIG. 4(a).

FIG. 5(a) shows an exemplary six row by six column array or region of pixels in an exemplary image. Each location in the array has pixel value X designated additionally by a subscript indicating row and column position. Hence, the pixel $X_{23}$ is a pixel value in the second row and third column of the array. The scaling technique described above can be applied to any image array such as the well-known Bayer pattern CFA wherein each pixel value is only an 8-bit single Red, or Green or Blue associated value.

The scaling technique in one embodiment of the invention involves applying the DWT across the image region in one direction, and then applying the DWT again to the result in another direction. FIG. 5(a) shows a row-wise application of the DWT that results in an array of pixels designated by X' and corresponding subscripts. FIG. 4(a) is a DWT architecture that begins generating, as shown by Table 1 above, a valid output is observed after the first five inputs are applied thereto and thereafter, and output value is generated for every input thereafter, leading to a 100% throughput, i.e., one output for every clock cycle. These initial five values is referred to as the "first iteration" of the DWT. FIG. 5(a) shows five exemplary inputs belonging to the first row and the first iteration when the image array is considered rowwise, namely $X_{11}, X_{12}, X_{13}, X_{14}$ and $X_{15}$. The first row, first iteration inputs are circled in solid lines on the input array of FIG. 5(a). Referring to the architecture of FIG. 4(a), the input line 300 would during the first row, first iteration operation receive in succession the inputs $X_{11}, X_{12}, X_{13}, X_{14}$ and $X_{15}$. When input line 300 receives $X_{11}$, it cascades down the line being delayed by delay elements 310, 312, 314 and 316 in succession. When $X_{11}$ passes beyond delay element 316 and is input to the $D_4$ 328 module, the input line 300 will be receiving $X_{15}$. At this point, $X_{14}$ will have passed delay element 310 and be input to $D_1$ 322, $X_{13}$ will have passed delay element 312 and be input to $D_2$ 324 and so on. On that fifth clock cycle (i=4 in FIG. 4(a)), the output line 350 will show the first valid result $a_0$. This ao is the result value $X'_{11}$ shown in FIG. 5(a). $X'_{11}$ is thus a sum of the results of the inputs of the first row, first iteration ($X_{11}$ through $X_{15}$) multiplied by the stored coefficients in the DWT modules. Referring to Table 1 above, $X'_{11}$ of the result array of FIG. 5(a) is thus, $X'_{11}=h_0X_{11}+h_1X_{12}+h_2X_{13}+h_3X_{14}+h_4X_{15}$ where $h_0, h_1, h_2, h_3$ and $h_4$ are the coefficients of the DWT embedded in modules $D_4, D_3, D_2, D_1$ and $D_0$, respectively.

On the next or sixth clock cycle, where i=5, $a_1$ is observed at the output (see Table 1 above). Referring to FIG. 5(a) this is considered the second iteration of the first row. In the first row, second iteration, the inputs utilized are $X_{12}, X_{13}, X_{14}, X_{15}$ and $X_{16}$ indicated in FIG. 5(a) by dashed lines. At the sixth clock cycle in the architecture of FIG. 4(a), the input to $D_4$ from the previous clock cycle ($X_{11}$) is replaced by the input to $D_3$ ($X_{12}$). Also, the input to $D_0$ directly connected to input line 300 is the next pixel scanned in the row or $X_{16}$ since $X_{15}$ was the previous input thereto. The output of the sixth clock cycle is observable and valid and corresponds to $X'_{12}$ of the result array. Since the architecture of FIG. 4(a) holds four inputs and replaces the oldest input with the newest input appearing at input 300, the architecture is capable of sampling 5 inputs at each clock cycle and producing one output, leading to a 100% throughput. After the first iteration (i=4), each new input pixel will yield an output pixel on the same clock cycle. Though not shown in FIG. 5(a) this technique is repeated with the next input $X_{17}$ which replaces input value $X_{12}$ in the architecture on the third iteration (i=6). Since the pixels are cascaded into the architecture, the valid observed outputs $a_{i-4}$ 350 in FIG. 4(a) may directly be written to the image array replacing its counterpart original pixel immediately upon observation. Thus, the same memory utilized to store the original image may be re-used to store the result array from the row-wise DWT.

In the manner described above, each successive grouping of five pixel values in a row may be input to the DWT architecture to generate a row of values for the result array. This process is repeated for each row in the original image array. FIG. 5(a) shows the second row, first iteration inputs $X_{21}, X_{22}, X_{23}, X_{24}$ and $X_{25}$ (circled in solid lines) which are input to the FIG. 4(a) architecture in succession and again, at the fifth clock cycle for that second scanned row, the first valid output $X'_{21}$ is observed. Thereafter, at each successive iteration (clock cycle), an output is observed for each input, and thus 100% utilization. Thus, after an initial "loading" period of five clock cycles for each row, the architecture is utilized 100% for each result in the row. Though not shown, the above process is repeated for every row in the original image array and produces a corresponding result row such as that shown in FIG. 5(a).

The result array in FIG. 5(a) is not the 2:1 scaled image, but rather, represents two sub-bands, a HFS and a LFS. According to one embodiment of the invention, a column-wise DWT is applied to the LFS result of the row-wise DWT. FIG. 5(b) shows the application of a column-wise DWT to the result of the rowwise DWT shown in FIG. 5(a). One difference between the row-wise application of the DWT and the column-wise application of the DWT is which inputs are fed to the architecture of FIG. 4(a). In the column-wise DWT, a column of pixels rather than a row is considered. The first column, first iteration of the DWT applied in FIG. 5(b) utilizes the values $X'_{11}, X'_{21}, X'_{31}, X'_{41}$ and $X'_{51}$. These values are applied in succession to the architecture of FIG. 4(a) and when all five are loaded, will generate the scaled image result pixel $S_{11}$. Similar to the second iteration shown in FIG. 5(a) above, the second iteration of the first column of the result array replaces value $X'_{11}$ with $X'_{61}$ in the set of values. The other four values are maintained and cascade through the architecture on the sixth clock cycle. At sixth clock cycle, the scaled image pixel $S_{21}$ will be generated. Likewise, thereafter at every clock cycle, a new scaled image pixel will result. The DWT begins anew (clock cycle 0) after the first column of the result array is processed and the first column of pixels in the scaled image is obtained thereby. The second column of the scaled image is obtained in the same manner as the first column, with an initial loading period of five clock cycles to obtain the first scaled image pixel for the second column, namely, $S_{12}$. By repeatedly applying the DWT column-wise to the LFS result from FIG. 5(a), the scaled image can be obtained. As mentioned earlier, only the LFS is of interest in determining the scaled image. The HFS is ignored. Thus, when applying the DWT column-wise, only half of the columns from the result array of FIG. 5(a) need to be processed. If however the HFS(s) are also to be stored or maintained for up-scaling or reconstructing the scaled image back to the original size, then the column-wise DWT will be applied to the entire result so that HFS(s) can be stored separate of the scaled image, if necessary. Further, while a row-wise and then column-wise application of the DWT is proposed in at least one embodiment of the invention, in another embodiment of the invention a column-wise DWT may first be applied to the original image. Then, the row-wise DWT may be applied to the result of the column-wise DWT.

Figure 6:
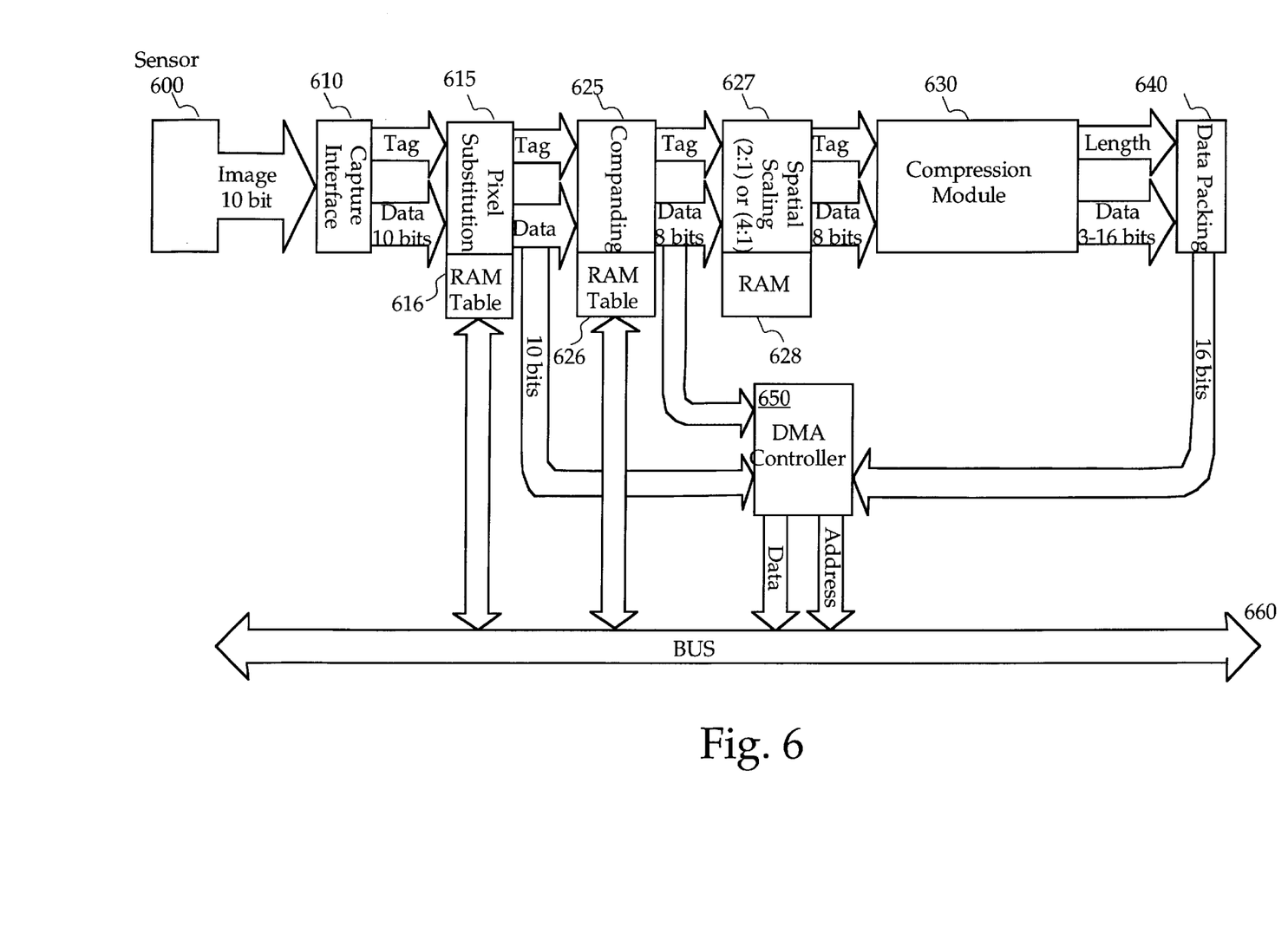
FIG. 6 is a diagram according to an embodiment of the invention.

FIG. 6 is a diagram according to an embodiment of the invention.

FIG. 6 is a block diagram of internal image processing and compression components of an image capture device. A sensor 600 generates pixel components which are color/intensity values from some source. The 10-bit pixel values generated by sensor 600 are sent to a capture interface 610. Sensor 600 in a digital camera context will typically sense either R, G, or B components from one "sense" of an area or location. Thus, the intensity value of each pixel is associated with only one of three color planes. Capture interface 610 captures the image generated by the sensor and appends Tags identifying color association for the individual pixels. The Tags are two bits each, for example, 00, 01, 10 and 11 for R (Red), G (even-row Green), G' (odd-row Green), B (Blue) pixels, respectively. The set of all such pixels for the entire image is the CFA or Color Filter Array.

It is typical in any sensor device that some of the pixel cells in the sensor plane may not respond to the lighting condition properly. As a result, the pixel values generated from these cell may be defective. These pixels are called "dead pixels." The "pixel substitution" unit 615 replaces each dead pixel by the immediate previously valid pixel in the row.

A RAM table 616 consists of the row and column indices of the dead pixels, which are supplied by the sensor. This RAM table 616 helps to identify the location of dead pixels in relation to the captured image. Companding module 625 is a table look-up based converter to convert each original pixel of 10-bit (labeled 10b) intensity captured from the sensor to an 8-bit intensity value. A RAM table 626 accompanies companding module 625 and stores the entries of this exemplary sensor companding table. Thus, each pixel in the CFA will be an 8-bit value representing one of the four color planes.

After companding, a spatial scaling unit 627 is used to scale down the image. If the original image size is M×N, a 2:1 scaling operation scales the image size down to M/2× N/2, while a 4:1 scaling operation scales the image size down to M/4×N/4. RAM 628 accompanies spatial scaling unit 627 and is used for intermediate storage during the scaling operation. According to one embodiment of the invention, scaling unit 627 is composed of a DWT architecture such as that shown in and described above with respect to FIG. 4(a). The DWT architecture is accompanied by clocking and other signaling means that control the behavior of the architecture, particularly when the architecture is ready to be reset to handle processing of the next column or row of data. In the case of a CFA being the original image that is to be scaled, the DWT technique described above may be modified, so that pixels associated in a given color plane are separated from other pixels such that the DWT considers in a particular iteration only other pixels of the same color as the result or scaled image pixel being computed.

According to various embodiments of the invention, scaling unit 627 is capable of efficiently and accurately performing both 2:1 and 4:1 scaling using DWT decomposition. Though the above embodiments show 2:1 scaling, where every two rows and two columns of pixels is replaced with a single pixel in the scaled image, a 4:1 scaling may be achieved by applying the DWT four times instead of only twice. For 4:1 scaling, the DWT is applied twice row-wise and twice column-wise, in any suitable order. Additionally, 4:1 scaling may be achieved by applying 2:1 scaling again to the 2:1 scaled result described above. With DWT-based scaling implemented, scaled image data can more rapidly be generated and sent to the other image processing units shown in FIG. 6 and ultimately, will speed the delivery of image data over bus 660 and out of the image capture device. This is especially advantageous for the 4:1 scaling operation, which is used in videoconferencing where (frame rate maintenance) is important. The quality of the scaled image is also improved over traditional scaling in that the DWT is better suited to detecting edge features, which are essentially discontinuities, within a given image region. The scaled image data, obtained pixel by pixel may be passed to a compression module 630 which compacts and encodes the scaled image data into manageable and transportable blocks. The encoded compressed image data, which is then of a variable or fixed length is then packed together by a data packing unit 640 and then out to DMA controller 650 for transfer across BUS 660. Bus technology, addressing protocols and DMA controllers are well-known in the art of system design and can be readily modified/specialized to fit the desired application.

Each of the RAM tables 616, 626 and 628 can directly communicate with bus 660 so that their data can be loaded and then later, if desired, modified. Further, those RAM tables and other RAM tables may be used to store scaled image data or intermediate result data as needed. Though the individual components (selectors, shifters, registers, and control address signals) of scaling unit 627 have not been detailed, one skilled in the art will readily be able to implement such a scaling device, particularly given the exemplary architecture of FIG. 4(a). The efficiency and ease of dual-mode scaling is possible due to the multi-level nature of the DWT and the preservation of key image features in low frequency sub-bands. Further, as demonstrated earlier, the scaled image will have edge features preserved in a better manner than with traditional scaling. Further, DWT coefficients may be hardcoded into registers in processing cells or may be programably modified if desired.

Figure 7:
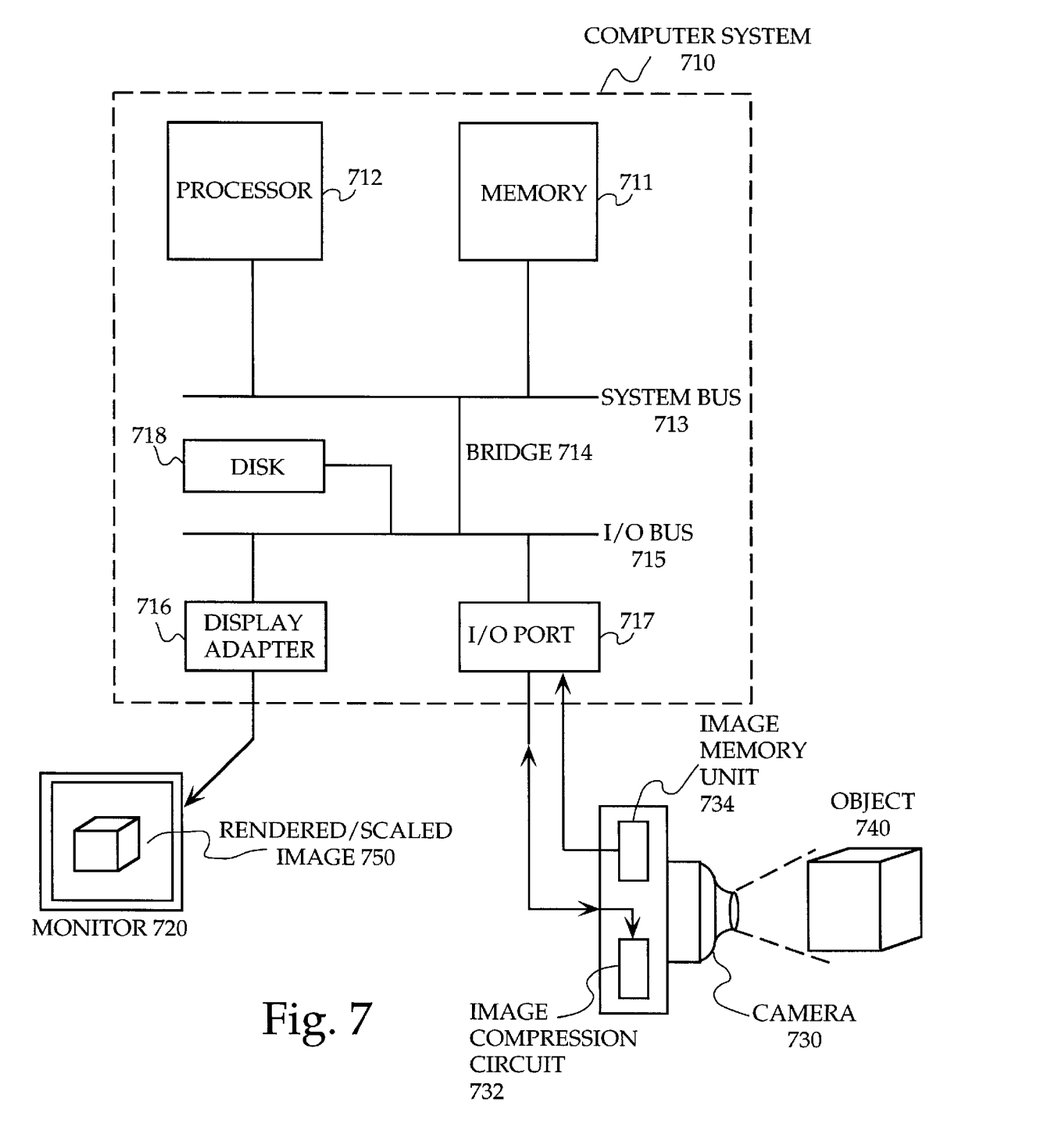
FIG. 7 is a system diagram of one embodiment of the invention.

FIG. 7 is a system diagram of one embodiment of the invention.

Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture a sensor image of an scene 740. Essentially, captured images are processed by an image processing circuit 732 so that they can be efficiently stored in an image memory unit 734, which may be a ROM, RAM or other storage device such as a fixed disk. The image contained within image memory unit 734 that is destined for computer system 710 even if scaled is enhanced in that the loss of image features due to traditionally scaling is greatly mitigated by better preserving edge features when scaling. In most digital cameras that can perform still imaging, images are stored first and downloaded later. This allows the camera 730 to capture the next object/scene quickly without additional delay. However, in the case of digital video camera, especially one used for live videoconferencing, it is important that images not only be quickly captured, but quickly processed and transmitted out of camera 730. The invention in various embodiments, particularly in scaling operation, is well-suited to providing good fast throughput to other parts of the image processing circuit 732 so that the overall speed of transmitting image frames is increased.

Image scaling is carried out within the image processing circuit 732 in this embodiment of the invention. After the image is scaled, it may also be compressed for transport. The decompression of the compressed and scaled image may be achieved using a processor 712 such as the Pentium® processor (a product of Intel Corporation) and a memory 711, such as RAM, which is used to store/load instruction addresses and result data. In an alternative embodiment, scaling may be achieved in software application running on computer system 710 rather than directly in hardware. The application(s) used to generate scaled image pixels after download from camera 730 may be from an executable compiled from source code written in a language such as C++. The instructions of that executable file, which correspond with instructions necessary to scale the image, may be stored to a disk 718 or memory 711. It would be readily apparent to one of ordinary skill in the art to program a computing machine to scale an image in accordance with the methodology described above. Further, the various embodiments of the invention may be implemented onto a video display adapter or graphics processing unit that provides scaling in various scaling factors.

Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

When an image, such as an image of a scene 740, is captured by camera 730, it is sent to the image processing circuit 732. Image processing circuit 732 consists of ICs and other components which execute, among other functions, the scaling down of the captured image. The scaling operation, as described earlier, may utilize image memory unit to store the original CFA of the scene 740 captured by the camera 730. Further, this same memory unit can be used to store the scaled image CFA. Once all pixels are scaled, processed and transferred to the computer system 710 for rendering, the camera 730 is free to capture the next image. The dual-moded nature and multi-resolution of the DWT scaling technique in one embodiment of the invention allows for camera 730 to act as either a motion (4:1 scaling) or still camera (2:1 scaling) as is desired. When the user or application desires/requests a download of images, the scaled compressed images stored in the image memory unit are transferred from image memory unit 734 to the I/O port 717. I/O port 717 uses the bus-bridge hierarchy shown (I/O bus 715 to bridge 714 to system bus 713) to temporarily store the scaled and compressed image data into memory 711 or, optionally, disk 718.

The compressed images are decompressed on computer system 712 by suitable application software (or hardware), which may utilize processor 712 for its execution. The image data may then be rendered visually using a display adapter 716 into a rendered/scaled image 750. The scaled image is shown as being smaller in size than the original captured scene. This is desirable in many image applications where the original sensor capture size of a scene is not needed. In a videoconferencing application, the image data in its compressed and scaled form may be communicated over a network or communication system to another node or computer system in addition to or exclusive of computer system 710 so that a videoconferencing session may take place. Since scaling and compression are already achieved on-camera in one embodiment of the invention, it may be possible to implement a communication port in camera 730 that allows the image data to be transported directly to the other node(s) in a videoconferencing session. Wherever a user of computer system 710 also desires to see his own scene on monitor 720, image data that is scaled and compressed may be sent both to computer system 710 and transported over a network to other nodes. Further, the various embodiments of the invention allow also for efficient software scaling to be implemented if desired. As discussed earlier, the scaled image will have more visually accurate edge features than typical in scaling operations due to the enhancement in the scaling process by specifically and carefully selecting the DWT coefficients. The end result will be a higher quality rendered scaled image 750 that displayed onto monitor 720 or other nodes in a videoconferencing session as compared with even typical scaling methods. Upscaling is possible by applying the inverse DWT upon the DWT sub-bands that represent various features of the image.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A method comprising:

applying a discrete wavelet transform in a first direction to an image generating thereby a first high frequency sub-band (HFS) and a first low frequency sub-band (LFS); and applying a discrete wavelet transform (DWT) in a second direction to said LFS, and selectively adding results of said applying a DWT generating thereby a low frequency sub-band of said LFS and a high frequency sub-band of said LFS, said low frequency sub-band of said LFS representing a scaled version of said image.

2. A method according to claim 1 wherein said first direction is row-wise and said second direction is column-wise.

3. A method according to claim 1 wherein said first direction is column-wise and said second direction is row-wise.

4. A method according to claim 1 wherein said discrete wavelet transform is a bi-orthogonal spline filter.

5. A method according to claim 1 wherein said steps of applying are repeated to further scale said image to a lower resolution.

6. A method according to claim 1 wherein reconstruction of said image to original size comprises the steps of:

approximating to zero all pixels in all sub-bands except the low frequency sub-band of the LFS; and applying the inverse DWT in at least one direction to the low frequency sub-band of the LFS and to the zero-approximated sub-bands, the result of said inverse DWT said original image at its original size prior to scaling.

7. An image scaling apparatus comprising:

a plurality of processing cells, each cell generating an intermediate output, said output a function of a low-pass discrete wavelet transform (DWT) coefficients and a selected input pixel value from said image;

an adder coupled to said plurality of processing cells selectively adding said outputs to generate a first set of low frequency sub-bandd (LFS) outputs of a DWT; and delay elements selectively coupled to said processing cells cascading said input pixel values to other said processing cells.

8. An apparatus according to claim 7 wherein each said low-pass DWT coefficients are symmetric, said symmetry reducing the number of processing cells required to compute said DWT.

9. An apparatus according to claim 7 wherein each processing cell receives a propagated input, each said cell adding said propagated input and said cascaded input, each said cell multiplying the sum by said low-pass DWT coefficient.

10. An apparatus according to claim 9, wherein each cell is comprised of an adder and a multiplier.

11. An apparatus according to claim 7, wherein said DWT coefficients are bi-orthogonal spline filter coefficients.

12. An apparatus according to claim 7 wherein said LFS outputs are fed back to said apparatus, generating thereby a second set of low frequency sub-band outputs, said second set of low frequency sub-band outputs representative of the image scaled in a 2:1 ratio.

13. An apparatus according to claim 12 wherein said second set of low frequency sub-band outputs are fed back to said apparatus generating thereby a third set of low frequency sub-band outputs, said third set of low frequency sub-band outputs representative of the image scaled in a 4:1 ratio.

14. An apparatus according to claim 12 wherein said selected input pixel value is obtained in a row-wise manner from said image and said LFS outputs are fed back in a column-wise manner.

15. An apparatus according to claim 7 providing 100% throughput after an initial loading period.

16. An image processing circuit comprising:
- an image scaling unit configured to perform discrete wavelet transform scaling of an input image, said image scaling unit including a plurality of processing cells, each cell generating an intermediate outout, said output a function of a low-pass discrete wavelet transform (DWT) coefficients and a selected inout pixel value from said image;
- an adder coupled to said plurality of processing cells selectively adding said outputs to generate a first set of low frequency sub-band (LFS) outputs of a DWT; and
- delay elements selectively coupled to said processing cells cascading said input pixel values to other said processing cells; and
- a memory coupled to said scaling unit, said memory storing scaled image data generated by said scaling unit.

17. An image processing circuit according to claim 16 for coupling to an image capture device configured to provide said input image.

18. An image processing circuit according to claim 16 for coupling to a data processing system, said data processing system configured to render said scaled image data.

* * * * *

UNITED STATES PATENT AND TRADEMARK OFFICE
CERTIFICATE OF CORRECTION

PATENT NO. : 6,215,916 B1
DATED : April 10, 2001
INVENTOR(S) : Tinku Acharya

It is certified that error appears in the above-identified patent and that said Letters Patent is hereby corrected as shown below:

Column 6,
Line 20, delete "$X_2$," and insert -- $x_2$, --.
Line 66, delete "$=\bigcup_k$" and insert -- $\sum_k$ --.

Column 9,
Line 14, delete "result $a_o$. This ao is" and insert -- result $a_o$. This $a_o$ is --.

Signed and Sealed this

Twenty-first Day of May, 2002

Attest:

*Attesting Officer*

JAMES E. ROGAN
*Director of the United States Patent and Trademark Office*